United States Patent
Nishizawa et al.

(10) Patent No.: US 6,947,625 B2
(45) Date of Patent: Sep. 20, 2005

(54) OPTICAL DEFLECTOR AND OPTICAL SWITCH

(75) Inventors: Motoyuki Nishizawa, Kawasaki (JP);
Masatoshi Ishii, Kawasaki (JP); Yasuo Yamagishi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 11/034,924

(22) Filed: Jan. 14, 2005

(65) Prior Publication Data
US 2005/0123228 A1 Jun. 9, 2005

Related U.S. Application Data

(62) Division of application No. 10/082,269, filed on Feb. 26, 2002, now Pat. No. 6,879,739.

(30) Foreign Application Priority Data

Sep. 26, 2001 (JP) .............................. 2001-293761

(51) Int. Cl.⁷ .......................... G02B 6/35; G02F 1/295
(52) U.S. Cl. ............................. 385/16; 385/8; 385/24
(58) Field of Search .......................... 385/1–10, 16–24

(56) References Cited

U.S. PATENT DOCUMENTS

| | | | | |
|---|---|---|---|---|
| 3,924,931 A | * | 12/1975 | Cheo | 385/8 |
| 4,145,109 A | * | 3/1979 | Nelson | 385/40 |
| 5,894,363 A | * | 4/1999 | Yamada et al. | 359/251 |
| 6,385,355 B1 | * | 5/2002 | Nashimoto et al. | 385/8 |
| 6,449,084 B1 | | 9/2002 | Guo | 359/315 |
| 2003/0026545 A1 | | 2/2003 | Deliwala | 385/40 |

FOREIGN PATENT DOCUMENTS

JP 9-5797 1/1997

OTHER PUBLICATIONS

Chen, et al.; "Guided-Wave Electro-Optic Beam Deflector Using Domain Reversal in LiTaO₃"; *Journal of Lightwave Technology*; vol. 12, No. 8; Aug. 1994; pp. 1401-1404.

Markowski, et al.; "Effect of Compositional Variations in the Lead Lanthanum Zirconate Stannate Titanate System on Electrical Properties"; Journal of American Ceramic Society; vol. 79, No. 12; Dec. 1996; pp. 3297-3304.

Uchino; "Shape Memory Material Using Antiferroelectrics"; *Oyo Buturi*; vol. 54, Jun. 1985; pp. 591-595.

* cited by examiner

*Primary Examiner*—Akm Enayet Ullah
*Assistant Examiner*—Michelle R. Connelly-Cushwa
(74) *Attorney, Agent, or Firm*—Armstrong, Kratz, Quintos, Hanson & Brooks, LLP

(57) ABSTRACT

The optical deflector comprises: an optical waveguide 12 of a dielectric material having electrooptical effect; and a pair of electrodes 10, 14 opposed to each other across the optical waveguide, an electric field is applied between the opposed electrodes to change a refractive index of the dielectric material to thereby control a propagating direction of signal light propagating in the optical waveguide 12, wherein the dielectric material has a first refractive index in its initial state, has a second refractive index by application of an electric field of a first polarity, and retains as a third refractive index a refractive index obtained after the electric field has been removed. The dielectric material has the third refractive index has the first refractive index by the application of an electric field of a second polarity different from the first polarity and removal of the electric field.

7 Claims, 6 Drawing Sheets

OPTICAL DEFLECTOR AND OPTICAL SWITCH

This application is a Divisional of prior application Ser. No. 10/082,269 filed on Feb. 26, 2002 now U.S. Pat. No. 6,879,739.

BACKGROUND OF THE INVENTION

The present invention relates to an optical deflector and an optical switch, more specifically an optical deflector which can retain a deflected state obtained when a drive voltage was applied even after the drive voltage is turned off, and an optical switch including such the optical deflector.

Because light enables high-velocity data transmission, optical communication is dominant in the long-distance transmission, such as the fundamental communication system. Recently the transmission band has been on increase while WDM (Wavelength Division Multiplex) technique has been developed. The optical communication has increasingly higher velocity and larger capacities. In the optical communication system, expansion of a WDM network from 1 versus 1 coupling to coupling between plural points requires an optical deflector for switching optical signals to different transferees.

As a conventional optical deflector is known the element using the mechanical micro mirror. For higher integration, higher velocity and lower losses, optical deflectors utilizing refractive index changes due to the electrooptical effect of ferroelectric materials have been also developed. In constituting the WDM network the latter optical deflector is very prospective. The electrooptical effect is the phenomena that refractive indexes of a substance are changed by application of electric fields.

Optical deflectors utilizing refractive index changes due to the electrooptical effect of ferroelectric materials are proposed by, e.g., Q. Chen et al. and described in the Laid-Open Japanese Patent Application No. Hei 09-5797.

The optical deflectors proposed by Q. Chen et al. are an optical deflectors using a prism domain inversion and an optical deflectors using a prism electrode having a Ti diffused waveguide and a proton exchange-type optical waveguide formed on a single crystal $LiNbO_3$ wafer (see, e.g., Q. Chen et al., J. Lightwave Tech. vol. 12 (1994) 1401). However, these optical deflectors require an inter-electrode gap of about 0.5 mm which is a thickness of the $LiNbO_3$ wafers. Accordingly their drive voltage is so high that even when a ±600 V drive voltage is applied, only an about 0.5° deflection angle can be obtained.

On the other hand, the optical deflector described in the Laid-Open Japanese Patent Application No. Hei 09-5797 comprises a thin film optical waveguide of a 600 nm-thick epitaxial PLZT film formed on (100) plane of an Nb doped conducting single crystal $SrTiO_3$ substrate. In the optical deflector described in the Laid-Open Japanese Patent Application No. Hei 09-5797, the drive voltage is swept in a −12 V to +12 V range, whereby a deflection angle of 10.8° is obtained.

However, in the above-described optical deflectors having the optical waveguides formed of $LiNbO_3$, PLZT, etc., refractive indexes of the optical waveguides change by an amount proportional to an applied voltage, and in order to retain a deflected state of light, a voltage must be kept applied. A deflected state at the time of application of a drive voltage cannot be memorized. When the supply of a source power is paused because of a power supply failure, the deflected states of respective optical deflectors must be set again.

SUMMARY OF THE INVENTION

An object of the present invention is to provide an optical deflector which can retain a deflected state of light obtained when a drive voltage was applied even after the drive voltage is turned off, and an optical switch including such the optical deflector.

According to one aspect of the present invention, there is provided an optical modulator comprising: an optical waveguide formed of a dielectric material having electrooptical effect; and electrodes opposed to each other across the optical waveguide, an electric field being applied between the electrodes to change a refractive index of the dielectric material to thereby control a propagating direction of a signal light propagating in the optical waveguide, the dielectric material having a first refractive index in its initial state, having a second refractive index by application of an electric field of a first polarity, and retaining a third refractive index obtained after the electric field has been removed, and the dielectric material having the third refractive index having the first refractive index by the application of an electric field of a second polarity different from the first polarity and removal of the electric field.

According to another aspect of the present invention, there is provided an optical deflector comprising: an optical waveguide formed of a dielectric material having electrooptical effect; and electrodes opposed to each other across the optical waveguide, an electric field being applied between the electrodes to change a refractive index of the dielectric material to thereby control a propagating direction of a signal light propagating in the optical waveguide, the dielectric material having a first refractive index in its initial state, having a refractive index changed to a second refractive index by application of an electric field of a first polarity, and retaining a third refractive index obtained after the electric field has been removed, and the dielectric material having the third refractive index having the first refractive index by the application of an electric field of a second polarity different from the first polarity and removal of the electric field.

According to further another aspect of the present invention, there is provided an optical deflector comprising: an optical waveguide formed of a dielectric material having electrooptical effect; and electrodes opposed to each other across the optical waveguide, an electric field being applied between the electrodes to change a refractive index of the dielectric material to thereby control a propagating direction of a signal light propagating in the optical waveguide, having a first deflection angle in its initial state, having a second deflection angle by application of an electric field of a first polarity, and retaining a third reflection angle obtained after the electric field has been removed, and having the first reflection angle by the application of an electric field of a second polarity different from the first polarity in a state having the third reflection angle and removal of the electric field.

According to further another aspect of the present invention, there is provided an optical deflector comprising: a slab waveguide formed on a substrate and formed of $(Pb_{1-w}M_w)(Zr_{1-x-y}Ti_xSn_y)_zO_3$ (wherein $0 \leq w \leq 0.5$, $0 < x \leq 0.5$, $0 < y \leq 0.5$, $0.8 \leq z \leq 1.2$; and M is one kind, or two or more kinds of elements selected from a group consisted of lanthanum, niobium, tantalum, barium and strontium); and an electrode formed on the slab waveguide, an electric field being applied to the slab waveguide by applying a prescribed voltage to the electrode to change a refractive index of the slab waveguide so as to control a propagating direction of a signal light propagating in the slab waveguide.

According to further another aspect of the present invention, there is provided an optical switch comprising: a slab waveguide formed of $(Pb_{1-w}M_w)(Zr_{1-x-y}Ti_xSn_y)_zO_3$ (wherein $0 \leq w \leq 0.5$, $0 < x \leq 0.5$, $0 < y \leq 0.5$, $0.8 \leq z \leq 1.2$; and M is one kind, or two or more kinds of elements selected from a group consisted of lanthanum, niobium, tantalum, barium and strontium); an input waveguide optically coupled to the slab waveguide, for inputting signal light to the slab waveguide; an optical deflector having electrodes opposed to each other across the slab waveguide, for applying an electric field to the slab waveguide to change a refractive index to thereby control a propagating direction of the signal light propagating in the slab waveguide; and a plurality of output waveguides optically coupled to the slab waveguide, for outputting the signal light through the slab waveguide, the signal light inputted to the input waveguide being outputted to an arbitrary one of the output waveguides.

According to further another aspect of the present invention, there is provided a deflection direction control method for an optical deflector comprising: an optical waveguide of a dielectric material having electrooptical effect; and a pair of electrodes opposed to each other across the optical waveguide, for applying an electric field between the pair of electrode to change a refractive index of the dielectric material to thereby control a propagating direction of a signal light propagating in the optical waveguide, wherein an electric field of a first polarity is applied to the dielectric material of a first refractive index in its initial state and removing the electric field to thereby make the refractive index of the dielectric material to be a second refractive index different from the first refractive index, whereby a deflection direction of the signal light is changed.

As described above, according to the present invention, the optical waveguide is formed of a PMZTS film of a prescribed composition ratio, whereby a refractive index memorizable optical deflector which, even when the application of a voltage is stopped because of an electric power failure, can retain a deflected state immediately before the voltage application stop can be constituted. The optical switch includes such optical deflector, whereby even when application of a voltage is stopped because of an electric power failure, the optical switch can retain a couple state established immediately before the voltage application stop.

DETAILED DESCRIPTION OF THE INVENTION

A First Embodiment

The optical deflector according to a first embodiment of the present invention will be explained with reference to FIGS. 1A–1B, 2A–2B, and 3A–3C.

Figure 1A:
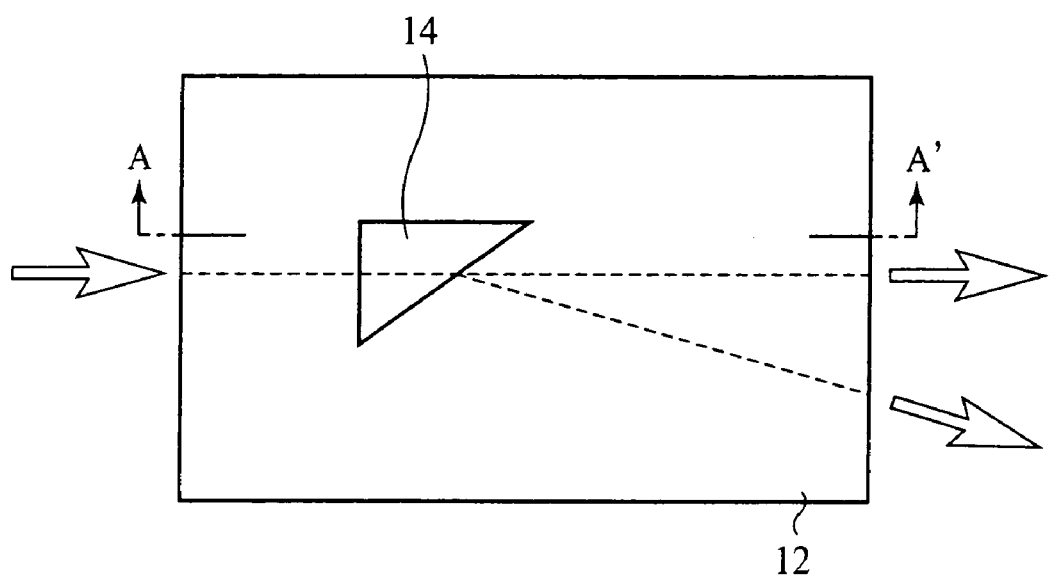
FIGS. 1A and 1B are a plan view and a diagrammatic sectional view of the optical deflector according to a first embodiment of the present invention, which show the structure thereof.
Figure 1B:
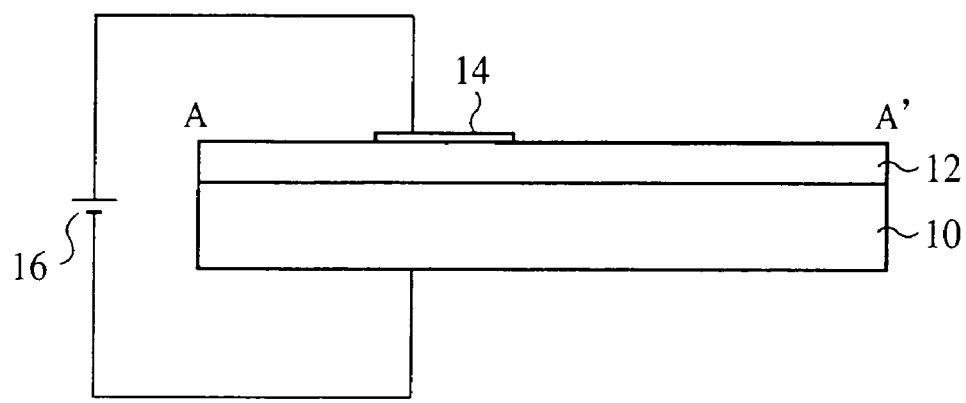
Figure 2A:
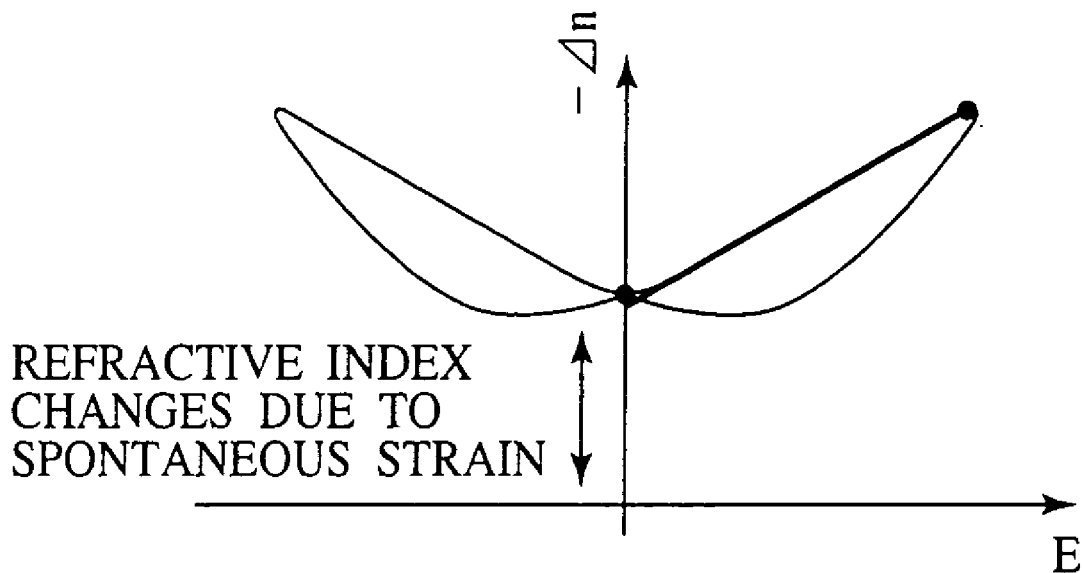
FIG. 2A is a graph of refractive index change characteristics of the optical deflector of the conventional optical deflectors.
Figure 2B:
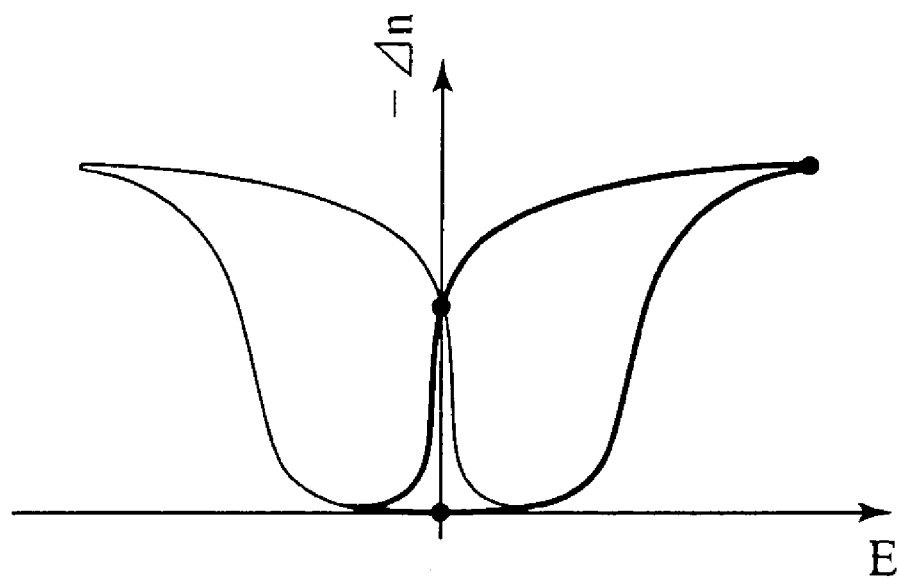
FIG. 2B is a graph of refractive index change characteristics of the optical deflector according to the first embodiment of the present invention.
Figure 3A:
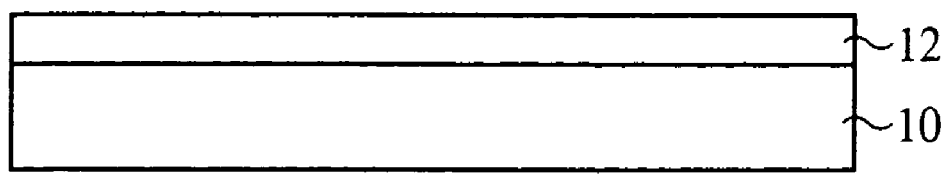
FIGS. 3A–3C are sectional views of the optical deflector according to the first embodiment of the present invention in the steps of the method for fabricating the same, which show the method.
Figure 3B:
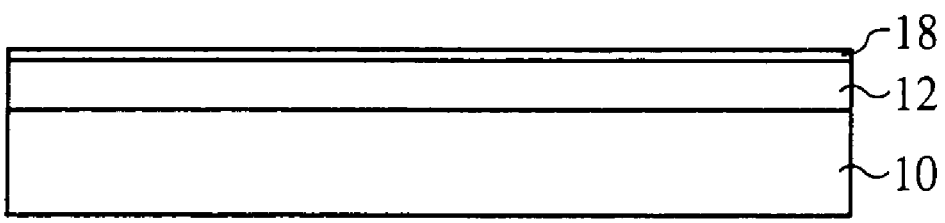
Figure 3C:
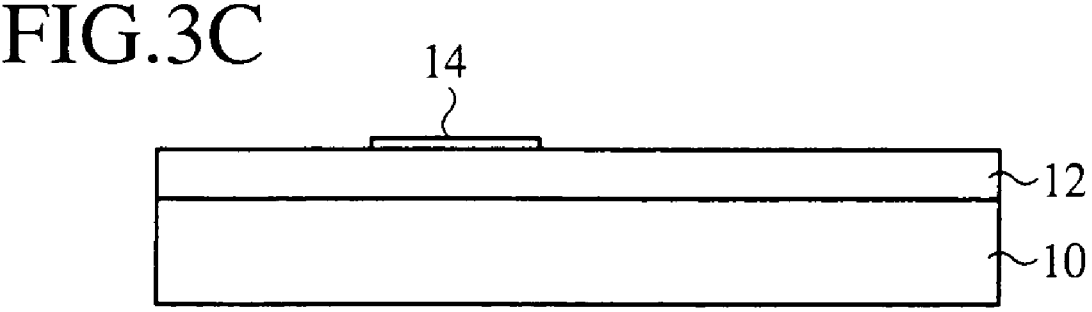

FIGS. 1A and 1B are a plan view and a diagrammatic side view of the optical deflector according to the present embodiment, which show a structure thereof. FIG. 2A is a graph of refractive index change characteristics of the optical deflector the conventional optical deflectors. FIG. 2B is a graph of refractive index change characteristics of the optical deflector according to the present embodiment. FIGS. 3A–3C are sectional views of the optical deflector according to the present embodiment in the steps of the method for fabricating the optical deflector, which show the method.

First, the structure of the optical deflector according to the present embodiment will be explained with reference to FIGS. 1A and 1B. FIG. 1A is the plan view of the optical deflector according to the present embodiment. FIG. 1B is the diagrammatic sectional view of the optical deflector according to the present embodiment along the line A-A' in FIG. 1.

A slab waveguide 12 formed of $(Pb_{1-w}M_w)(Zr_{1-x-y}Ti_xSn_y)_z$ $O_3$ film (hereinafter also called PMZTS film) on a substrate 10 formed of Nb-doped $SrTiO_3$. A triangular electrode 14 of ITO is formed on the slab waveguide 12. An electric power source 16 are connected between the substrate 10 and the electrode 14, so that a required drive voltage can be applied to the slab waveguide 12 in the region where the electrode 14 is formed.

As described above, the optical deflector according to the present embodiment is characterized mainly in that the slab waveguide 12 is formed of PMZTS film. Properties of PMZTS film will be explained in comparison with properties of materials forming the slab waveguide 12 of the conventional optical deflectors.

The conventional optical deflectors include the optical waveguides formed of ferroelectric films having electrooptical effect, such as $BaTiO_3$, $PbTiO_3$, $Pb_{1-x}La_x(Zr_yTi_{1-y})_{1-x/4}$ $O_3$, etc. These ferroelectric film have refractive index change characteristics as shown in FIG. 2A. That is, these ferroelectric films have spontaneous strains in their initial states, and have set refractive index change amounts in their states with 0 V applied. As the applied voltage is increased gradually from 0 V, their refractive indexes are gradually increased in proportion with change amounts of the applied voltage. Then, as the applied voltage is gradually decreased, their refractive index change amounts are gradually decreased in proportion with the applied voltage. When the applied voltage is returned to 0 V, their refractive index change amounts return to values of the initial states. The same changes are exhibited when an opposite electric field is applied to the ferroelectric films.

On the other hand, in the optical deflector according to the present embodiment, a ferroelectric film of PMZTS film is used as the optical waveguide. PMZTS film forming the optical deflector according to the present embodiment has the refractive index change characteristics shown in FIG. 2B. PMZTS film has the composition ratio adjusted suitably to be an antiferroelectric, which does no have spontaneous polarization in the initial state. In this case, as the applied voltage is gradually increased from 0 V, PMZTS film becomes ferroelectric, and have the refractive index changed in comparison with PMZTS film in the initial state. However, even when an applied voltage is thereafter gradually decreased, values of the refractive index do not follow the same trace, and even when a voltage is returned to 0 V, PMZTS film does not again become antiferroelectric. As a result, even with 0 V applied, a prescribed refractive index change amount remains. Such memorized refractive index change amount can be returned to that of the initial state by applying a small reverse bias to PMZTS film. That is, a refractive index is returned to a refractive index of the initial state by applying a reverse bias which does not oppositely strain the crystal. Even when the applied voltage is thereafter returned to 0 V, the refractive index in the initial state is maintained. The same changes are exhibited when an opposite electric field is applied to PMZTS film.

A PMZTS film suitable as the optical deflector according to the present embodiment is $(Pb_{1-w}M_w)(Zr_{1-x-y}Ti_xSn_y)_zO_3$ film. Composition ratios of w, x, and y are respectively $0 \leq w \leq 0.5$, $0 < x \leq 0.5$, $0 < y \leq 0.5$ and $0.8 \leq z \leq 1.2$, and M is one element or two or more elements of lanthanum (La), niobium (Nb), tantalum (Ta), barium (Ba) and strontium (Sr). Such compositions and the elements are used, whereby the PMZTS film having the above-described refractive index change characteristics can be obtained.

The slab waveguide 12 is formed of such PMZTS film, whereby a refractive index of the PMZTS film below the electrode 14 can be suitably changed by drive voltages applied to the electrode 14. Accordingly, signal light passing the slab waveguide 12 below the electrode 14 can be deflected in a deflection amount corresponding to a refractive index change amount in this region by prism effect of the PMZTS film below the electrode 14. A refractive index of the PMZTS film below the electrode 14 does not substantially change when an applied voltage is turned off, and even when the application of a voltage is paused due to an electric power failure, the PMZTS film there can be retained deflected immediately before the voltage application stop. In other words, it is not necessary to incessantly apply a drive voltage to the electrode 14, and the source power can be stopped with the PMZTS film there deflected, whereby the power consumption can be small.

Then, a method for fabricating the optical deflector according to the present embodiment will be explained with reference to FIGS. 3A–3C.

A PMZTS film of, e.g., $(Pb_{0.99}Nb_{0.02})(Zr_{0.562}Ti_{0.063}Sn_{0.375})_{0.98}O_3$ is epitaxially grown by, e.g., RF magnetron sputtering method on a conducting single crystal substrate 10 of Nb-doped $SrTiO_3$ having e.g., about 5–500 mΩ-cm resistivity to form the slab waveguide 12 of the PMZTS film on the substrate 10. The PMZTS film is formed in a 600 nm-thick, e.g., by sputtering using a PMZTS ceramic target with Pb excessively added by 5 wt %, at a 680° C. substrate temperature, under a 30 mTorr gas pressure, a gas flow rate ratio of $Ar/O_2=80/20$, for 5 hours. The PMZTS film can be formed by other processes, such as electron beam evaporation method, MOCVD method, sol-gel method, MOD method, etc.

Next, a 100 nm-thick ITO film 18 of, e.g., 1 mΩ-cm resistivity is formed on the slab waveguide 12 by, e.g., sputtering method.

Next, the ITO film is patterned by lithography and etching to form the triangle-shaped electrode 14 of the ITO film.

Thus, the optical deflector according to the present embodiment shown in FIGS. 1A and 1B is fabricated.

By the above-described fabrication method, an optical deflector of a PMZTS film of the composition $(Pb_{0.99}Nb_{0.02})(Zr_{0.562}Ti_{0.063}Sn_{0.375})_{0.98}O_3$ having a 2 mm width and a 10 mm height of the electrode 14 was fabricated. When a 10 V drive voltage was applied between the substrate 10 and the electrode 14, a deflection angle of light was about 3.7° The practical applied voltage could produce the practical deflection angle. A deflection angle at the time when the applied voltage was returned from 10 V to 0 V was about 3.5°. It has been found that even when an electric field is removed, a deflection angle substantially equal to a deflection angle obtained upon the application of a drive voltage can be retained. The optical deflector had about 0° deflection angle when an about −2.0 V voltage was applied to the element, and the deflection angle did not change after the electric field was removed.

As described above, according to the present embodiment, the optical waveguide is formed of a PMZTS film having a prescribed composition ratio, whereby a refractive index memorizable optical deflector which, even when the application of a voltage is stopped due to an electric power failure, can retain a deflected state immediately before the voltage application stop can be provided.

A Second Embodiment

The optical switch according to a second embodiment of the present invention will be explained with reference to FIGS. 4A–4B and 5A–5E.

Figure 4A:
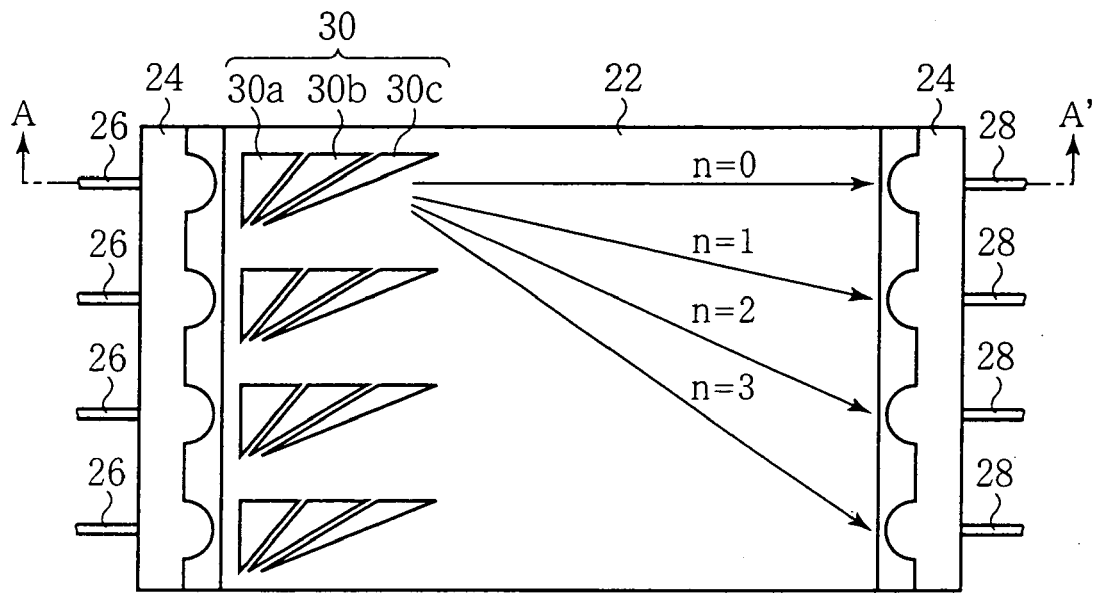
FIGS. 4A and 4B are a plan view and a diagrammatic sectional views of the optical switch according to a second embodiment of the present invention, which show the structure thereof.
Figure 4B:
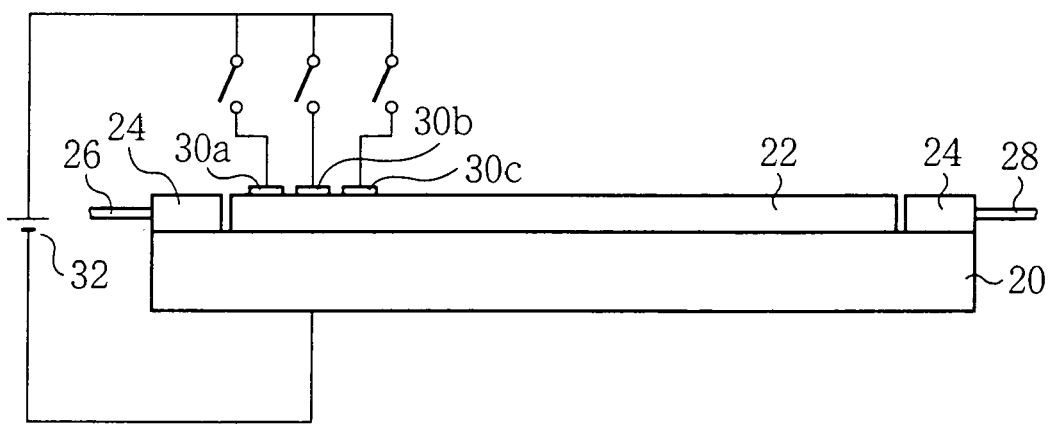

FIGS. 4A and 4B are a plan view and a diagrammatic sectional view of the optical switch according to the present embodiment, which show a structure thereof. FIGS. 5A–5E are sectional views of the optical switch in the steps of a method for fabricating the optical switch, which show the method.

First, the structure of the optical switch according to the present embodiment will be explained with reference to FIGS. 4A and 4B. FIG. 4A is a plan view of the optical switch according to the present embodiment, which shows the structure. FIG. 4B is a diagrammatic sectional views of the optical switch along the line A-A' in FIG. 4A.

A slab wave guide 22 of a PMZTS film is formed on a substrate 20 of Nb-doped $SrTiO_3$. Lenses 4 of quartz are formed on the substrate 20 in regions adjacent to the slab waveguide 22. Four lenses 24 are disposed on each of the opposed ends of the slab waveguide 22. The lenses 24 adjacent to one end (on the left side in FIG. 4A) of the slab waveguide 22 are optically connected respectively to input waveguides 26 for inputting signal light. The lenses 24 adjacent to the other end (on the right side in FIG. 4A) of the slab waveguide 22 are optically connected respectively to output waveguides 28 for outputting signal light.

Triangular electrodes 30 of an ITO film are formed on the slab waveguide 22. Each electrode 30 is constituted with electrodes 30a, 30b, 30c which are electrically insulated from one another. The electrodes 30a, 30b, 30c have heights which are substantially the same in the direction of propagation of signal light. An electric power source 32 is connected between the substrate 20 and the electrodes 30a, 30b, 30c, so that prescribed drive voltages can be applied independently to the respective regions of the slab waveguide 22, where the electrodes 30a, 30b, 30c are formed.

As described above, the optical switch according to the present embodiment is characterized mainly by comprising 4 input/output channels, the optical deflector according to the first embodiment, and a trisected electrode 30 corresponding to the electrode 14 of the optical deflector according to the first embodiment. This constitution enables signal light inputted into one of input waveguides 26 to be outputted to arbitrary one of the output waveguides 28. The use of the optical deflector according to the first embodiment makes it possible that when the application of a voltage is stopped because to an electric power failure, a coupling state immediately before the voltage application stop can be retained as it is.

Then, the operation of the optical switch according to the present embodiment will be detailed.

Signal light inputted to the input waveguide 26 is formed into substantially parallel beams by the lenses 24 and enters the slab waveguide 22. At this time, when the PMZTS film in the region where the electrodes 30 are formed has a refractive index equal to that of the rest region, the signal light guided in the slab waveguide 22 is not deflected and propagates straight to arrives at the opposed lenses 24. The signal light which entered the lenses 24 is condensed by the lenses 24 at the input end of the output waveguide 28 to be outputted through the output waveguides 28.

When a refractive index of the PMZTS film in the region where the electrodes 30 are formed is different from that of the rest region, signal light propagating in the slab waveguide 22 is deflected by prism effect. From which output waveguide 28 the signal light is to be outputted can be selected by a way of applying a voltage to the electrodes 30.

In the prism optical deflector, such as the optical deflector according to the first embodiment, a deflection angle of signal light is proportional to a height of a prism in the direction of propagation of the signal light. Here, a height of the prism corresponds to a height of the electrodes 30a, 30b, 30c. Accordingly, a deflection angle of the signal light can be arbitrarily controlled by a way of applying a voltage to the electrodes 30a, 30b, 30c. For example, in trisecting height-wise the electrode 30 of a 2 mm-width and a 20 mm-height into the electrodes 30a, 30b, 30c, a deflection angle of 1.23° can be obtained every time a voltage is applied to one electrode. 30a; 30b; 30c. For example, when a 10 V voltage is applied to the electrode 30a alone, a deflection angle of about 1.23° can be obtained; when a 10 V voltage is applied respectively to the electrodes 30a, 30b, a deflection angle of about 2.46° can be obtained; and when a 10 V voltage is applied respectively to the electrodes 30a, 30b, 30c, a deflection angle of about 3.7° can be obtained. That is, when a voltage is applied respectively to n of the divided electrodes, a deflection angle of 1.23×n degrees can be obtained. A beam deflection angle can be digitally controlled.

The output lenses 24 and the output waveguides are arranged corresponding to thus-obtained deflection angles, whereby signal light inputted to one input waveguide 26 can be outputted to an arbitrary output waveguide 28.

An optical deflector applicable to the optical switch according to the present embodiment is the refractive index memorizable optical deflector as described in the first embodiment. Accordingly, even when a voltage applied to the electrodes 30 is tuned off, a deflected direction of signal light can be maintained as it is. A refractive index of the PMZTS film in the region where the electrodes 30 are formed can be returned to its initial value by, e.g., applying a −2 V to the electrodes 30.

Then, a method for fabricating the optical switch according to the present embodiment will be explained with reference to FIGS. 5A–5E.

Figure 5A:
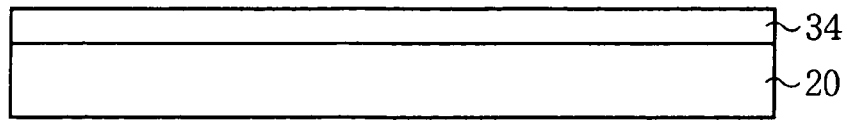
FIGS. 5A–5E are sectional views of the optical switch according to the second embodiment of the present invention in the steps of the method for fabricating the same, which show the method.

First, a 0.6 μm-thick quartz film 34 is formed by, e.g., plasma CVD on (100) plane of a conducting single crystal substrate 20 of Nb-doped $SrTiO_3$ having, e.g., about 5–500 mΩ-cm resistivity to form a 0.6 μm-thick quartz film 34 (FIG. 5A).

Figure 5B:

Then, the quartz film 34 is patterned by lithography and etching to form the lenses 24 of the quartz film 34 (FIG. 5B).

Figure 5C:
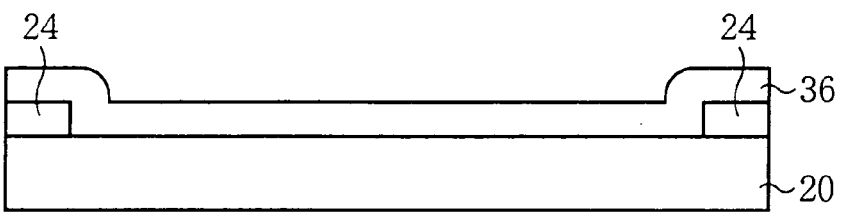

Then, on the substrate 20 with the lenses 24 formed on, the PMZTS film 36 of, e.g., the composition $(Pb_{0.99}Nb_{0.22})(Zr_{0.562}Ti_{0.063}SN_{0.375})_{0.98}O_3$ is epitaxially grown by, e.g., RF magnetron sputtering method (FIG. 5C).

Figure 5D:
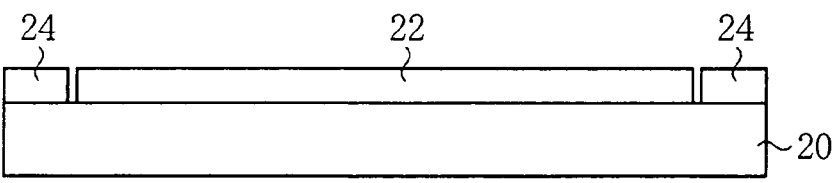

Next, the PMZTS film 36 is patterned by lithography and ion milling to form the slab waveguide 22 of the PMZTS film 36 (FIG. 5D).

Then, on the slab waveguide 22 a 100 nm-thick ITO film of, e.g., 1 mΩ-cm resistivity is formed by, e.g., sputtering method.

Figure 5E:
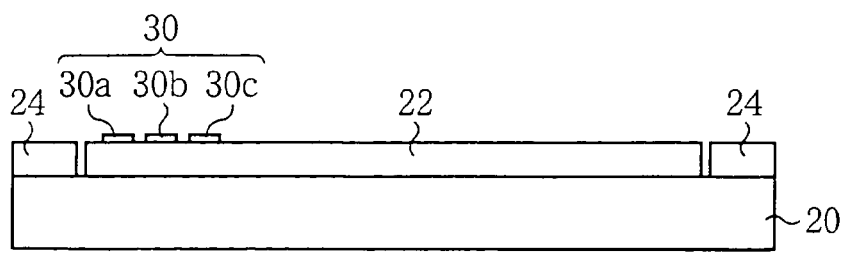

Then, the ITO film is patterned by lithography and etching to form the electrodes 30a, 30b, 30c of the ITO film (FIG. 5E).

Thus, the optical deflector according to the present embodiment shown in FIGS. 4A and 4B can be fabricated.

As described above, according to the present embodiment, the optical switch includes the optical deflector according to the first embodiment, whereby even when the voltage application is stopped because of a electric power failure, the optical switch can retain a state established immediately before the voltage application stop.

In the present embodiment, the optical switch has 4 input/output channels. However, a number of the channels can be suitably set, and in this case, the electrode 30 may be divided into a number of a channel number −1.

A Third Embodiment

The optical switch according to a third embodiment of the present invention will be explained with reference to FIG. 6. The same members of the present embodiment as those of the optical switch according to the second embodiment shown in FIGS. 4A–4B and 5A–5B are represented by the same reference numbers not to repeat or to simplify the explanation.

Figure 6:
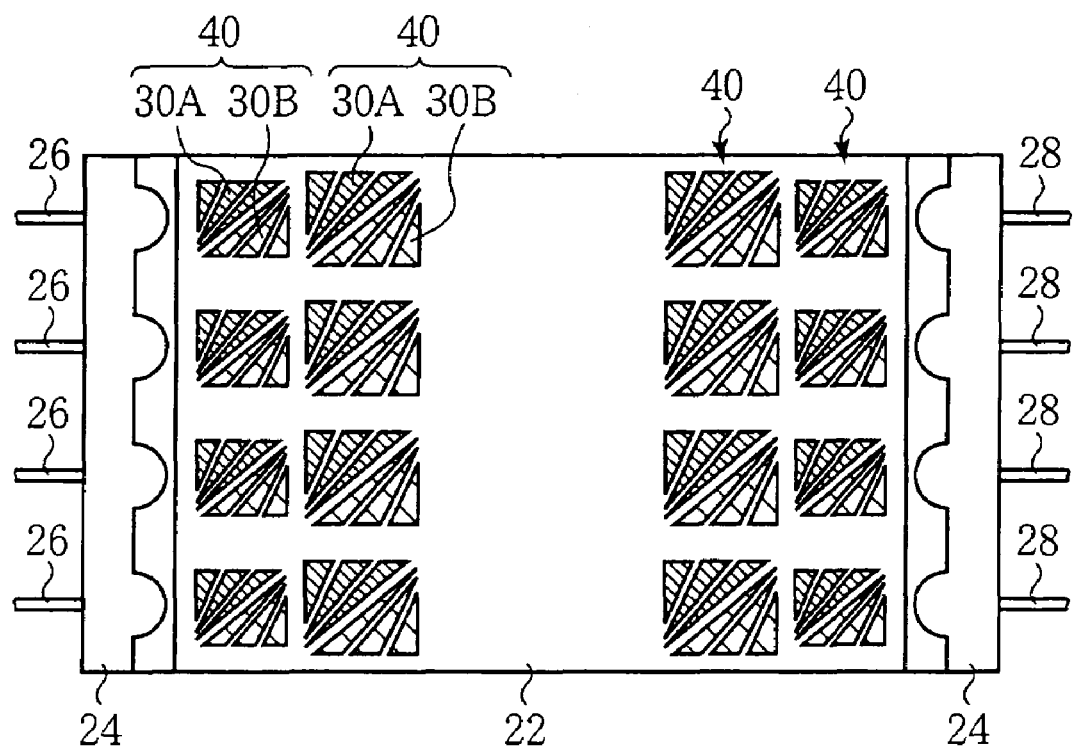
FIG. 6 is a plan view of the optical switch according to a third embodiment of the present invention, which shows the structure thereof.

FIG. 6 is a plan view of the optical switch according to the present embodiment, which shows a structure thereof.

The optical switch according to the present embodiment is the same as the optical switch according to the second embodiment except for the arrangement of electrodes disposed on a slab waveguide 22. That is, as shown in FIG. 6, in the optical switch according to the present embodiment, two right-angled triangular electrodes 30A, 30B (hereinafter also called an electrode pair 40) arranged with the hypotenuses opposed to each other constitute a basic unit, and sets of two electrode pairs 40 are disposed respectively near the input waveguide 26 and the output waveguide 28 of the slab waveguide 22.

The electrode pair 40 constitutes the so-called prism pair in the slab waveguide 22, and voltages of substantially the same intensity and reverse polarities are applied respectively to the electrode 30A and the electrode 30B. The thus-constituted prism pair can provide larger deflection angles in comparison with deflection angles provided by a single prism. Two electrode pairs 40 are arranged in the direction of propagation of signal light for further larger deflection angles.

The two electrode pairs 40 disposed near the output waveguide 28 return a propagation direction of the signal light deflected by the prism pair near the input waveguide 26. Disposing the prism pairs near the output waveguide 28 can improve light propagation ratios of propagating signal light to the output waveguide 28.

The electrodes 30A, 30B are each trisected, having substantially the same height in the propagating direction of signal light. The electrodes 30A, 30B are each trisected based on the same reason for trisecting the electrode 30 in the electrodes 30a, 30b, 30c in the second embodiment. The electrodes 30A, 30B are thus constituted, whereby, depending on how many electrodes of the trisected electrodes a drive voltage is applied to, signal light inputted to the input waveguide 26 can be outputted to an arbitrary one of the output waveguides 28.

As described above, according to the present embodiment, the optical switch includes the optical deflector according to the first embodiment, whereby even when the application of a voltage is stopped because of an electric power failure, the optical switch can maintain a coupled state established immediately before the voltage application stop.

In the present embodiment, two electrode pairs are disposed respectively near the input waveguides 26 of the slab waveguide 22 and near the output waveguides 28 of the slab waveguide 22. However, only one electrode pair, or three or more pairs may be disposed respectively near the input and the output waveguides 26, 28. The electrode pair is not essentially disposed near the output waveguides 28. Preferably, a number and an arrangement of the electrode pair is selected suitably corresponding to deflection angles, light propagation ratios, etc.

In the present embodiment, the optical switch has 4 input and output channels. However, a number of the channels can be suitably selected, and in this case, the electrodes 30A, 30B are sectioned in a number of at least (a channel number −1).

MODIFICATIONS

The present invention is not limited to the above-described embodiments and can cover other various modifications.

For example, in the second and the third embodiments, the electrode 30 is sectioned in the electrodes 30A, 30B with their heights in the propagating direction of signal light are the same. However, the sectioned electrodes do not essentially have the same height. It is preferable that the electrodes are sectioned in a way set suitably corresponding to an angle from positions of the electrodes to the respective output waveguides 28.

In the second and the third embodiments, the optical switches include the optical deflector according to the first embodiment. However, the optical deflector according to the first embodiment may be used in other devices. For example, the optical deflector according to the first embodiment is arranged to turn on and off output signal light, based on prescribed information or arranged to change a wavelength of input signal light to thereby constitute optical modulator.

In the first to the third embodiments, the electrodes are formed only on the upper surface of the slab waveguide, and the substrate is the lower electrode. However, lower electrodes may be formed between the substrate and the slab waveguide, and in this case, both the upper electrodes and the lower electrodes may be formed in a triangular shape, or either alone of the upper electrodes and the lower electrodes may be formed in a triangular shape.

What is claimed is:

1. An optical switch comprising:
    a slab waveguide formed of $(Pb_{1-w}M_w)(Zr_{1-x-y}Ti_xSn_y)_zO_3$ (wherein $0 \leq w \leq 0.5$, $0 < x \leq 0.5$, $0 < y \leq 0.5$, $0.8 \leq z \leq 1.2$; and M is one kind, or two or more kinds of elements selected from a group consisted of lanthanum, niobium, tantalum, barium and strontium);
    an input waveguide optically coupled to the slab waveguide, for inputting signal light to the slab waveguide;
    an optical deflector having electrodes opposed to each other across the slab waveguide, for applying an electric field to the slab waveguide to change a refractive index to thereby control a propagating direction of the signal light propagating in the slab waveguide; and
    a plurality of output waveguides optically coupled to the slab waveguide, for outputting the signal light through the slab waveguide,
    the signal light inputted to the input waveguide being outputted to an arbitrary one of the output waveguides.

2. An optical switch according to claim 1, wherein
    the optical deflector includes at least a couple of said electrodes which are in a triangular shape and arranged with the vertical angles directed in directions opposite to each other so as to constitute a prism pair in the slab waveguide.

3. An optical switch according to claim 1, wherein
    the electrode includes a plurality of triangular discrete electrodes, and selects the output waveguides, based on a number of the discrete electrodes to which a voltage is applied.

4. An optical switch according to claim 3, wherein
    the electrode is divided into n-1 pieces discrete electrodes when a number of the output waveguides is n.

5. An optical switch according to claim 1, wherein
    the optical deflector includes a first optical deflector disposed on the side of the input waveguide, and a second optical deflector disposed on the side of the output waveguides.

6. An optical switch according to claim 1, further comprising:
    a lens disposed between the input waveguide and the slab waveguide, for forming the signal light entering the input waveguide into substantially parallel beams and passing the beams into the slab waveguide.

7. An optical switch according to claim 1, further comprising:
    a lens disposed between the slab waveguide and the output waveguide, for condensing the signal light exiting the slab waveguide to the output waveguide.

* * * * *